A. BENSON.
GEAR CUTTER.
APPLICATION FILED NOV. 20, 1913.

1,258,859.

Patented Mar. 12, 1918.

Witnesses:
Wm. Geiger
Esther Abrams

Inventor:
Andrew Benson
By Munday, Evarts, Adcock & Clarke
Attys.

UNITED STATES PATENT OFFICE.

ANDREW BENSON, OF CHICAGO, ILLINOIS, ASSIGNOR TO BENSON GEAR COMPANY, OF CHICAGO, ILLINOIS, A CORPORATION OF ILLINOIS.

GEAR-CUTTER.

1,258,859. Specification of Letters Patent. Patented Mar. 12, 1918.

Application filed November 20, 1913. Serial No. 802,016.

*To all whom it may concern:*

Be it known that I, ANDREW BENSON, a citizen of the United States, residing in Chicago, in the county of Cook and State of Illinois, have invented a new and useful Improvement in Gear-Cutters, of which the following is a specification.

This invention relates to improvements in gear cutters.

One object of the invention is to provide a gear cutter of simple construction which is suitable for cutting or generating the teeth of that type of worm-gears used in conjunction with worms of the Hindley screw form.

Another object of the invention is to provide a gear cutter so arranged that it cuts or generates one face at a time only of the teeth of the worm-gear.

Another object of the invention is to devise a gear cutter of the type above indicated so formed that it may be sharpened as the active cutting edges wear and at the same time maintain the proper relation between the faces of the cutter to properly generate the teeth being cut.

The invention furthermore consists in the improvements in the parts and devices and in the novel combination of the parts and devices as herein shown, described and claimed.

Figure 1:
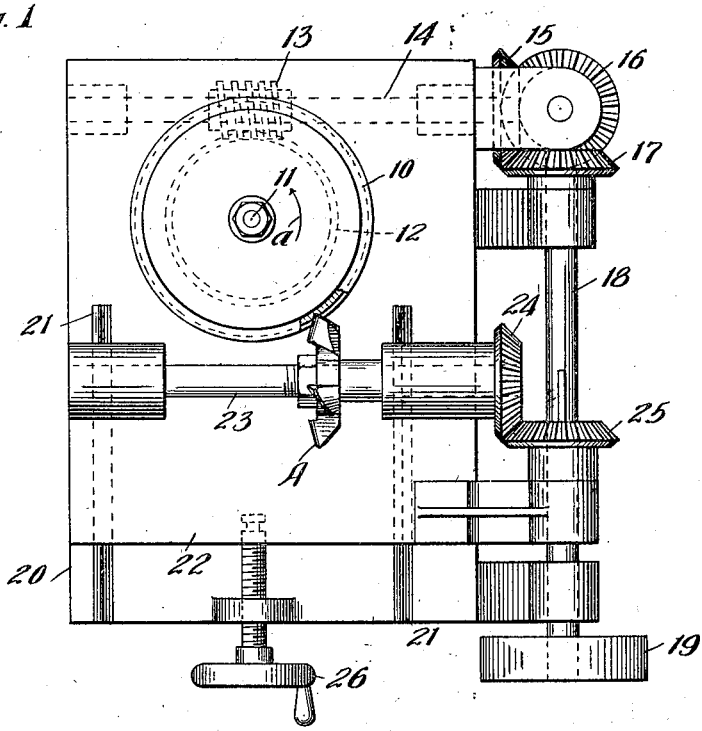
Figure 2:
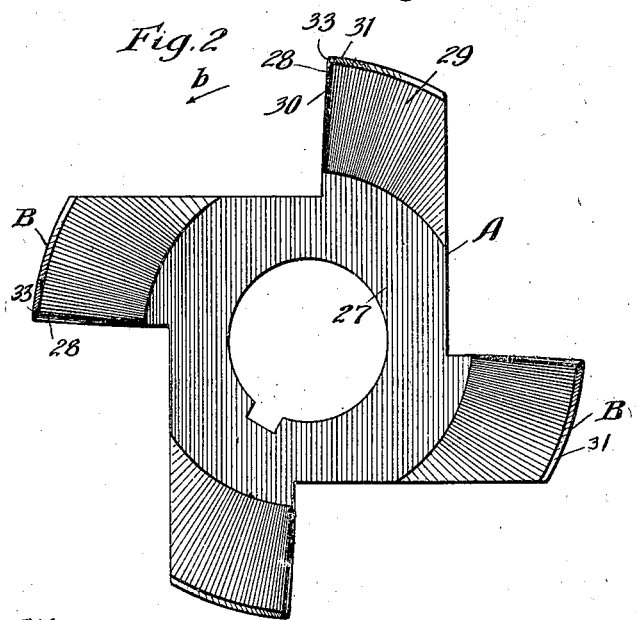
Figure 3:
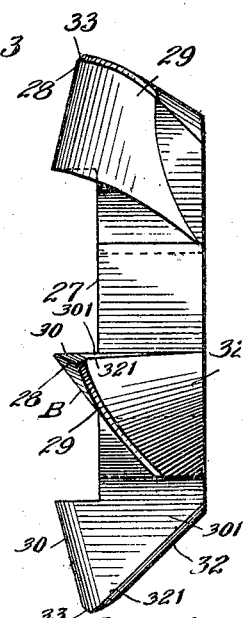

In the drawing forming a part of this specification, Figure 1 is a top plan view of a gear cutting machine showing the method of using my improved gear cutter. Fig. 2 is a side elevation of a gear cutter embodying my improvements, and Fig. 3 is an edge elevation of the cutter shown in Fig. 2.

The gear cutter, herein shown, described and claimed, is particularly adapted for carrying out the processes disclosed in my co-pending applications No. 745891, filed Feb. 3, 1913, for process of cutting worm-gears, and No. 788551, filed Sept. 8, 1913, for process of cutting worm-gears.

In Fig. 1, the worm-gear blank 10 is shown as mounted on a vertical arbor 11 rotated by worm-gear 12, worm 13 mounted on shaft 14, bevel gears 15, 16 and 17, the latter being mounted on shaft 18 driven by pulley 19, all of said parts being suitably supported in a frame 20. Mounted on the top of the frame on guide-ways 21 is a reciprocating slide 22 having mounted thereon a horizontally extending rotatable shaft 23 adapted to be driven by bevel gears 24 and 25, the latter being slidably keyed to the shaft 18 as shown. The slide 22 is moved inwardly and outwardly relatively to the arbor 11, having the gear blank 10 thereon, by hand adjusting screw 26. Secured to the shaft 23 is my improved gear cutter A which, as shown, comprises a central portion or hub 27 recessed to slide on and to be keyed with the shaft 23, the hub having formed integral therewith a plurality of projections or extensions B, all of which are identical so that only one of them will be described in detail. Each of the projections or extensions B has a cutting edge 28 which extends in a radial plane from the axis of rotation of the cutter and is inclined thereto. The cutting edge 28 is formed by the intersection of a surface 29 and another surface 30. Surface 29 coincides with a portion of a helical surface generated by an imaginary line inclined to the axis of rotation of the cutter which rotates about said axis and advances simultaneously therealong at a constant rate or in other words, the axis of generation of the surface 29 coincides with the axis of rotation of the cutter. The surface 30, as shown, is a relatively short plane surface slightly inclined to the axis of rotation of the cutter and to another longer plane and surface 301. The peripheral edge surface 31 of each projection B is a narrow helical surface, and the outer face 32 of each projection B is also a helical surface, the axes of generation of these surfaces also coinciding with the axis of rotation of the cutter. The edge 321 formed at the intersection of the surfaces 301 and 32 also constitutes an active cutting edge. Each active cutting portion on each projection B corresponds to a section through the end portion of a thread of the Hindley screw or worm with which the worm-gear being generated is designed to coöperate so that each cutting edge 28 will traverse a path during the gear cutting process which corresponds exactly to the path traveled by the end portion of a thread of the Hindley screw or worm. As will be understood, the worm-gear blank 10 is rotated in the direction indicated by the arrow *a* and the gear cutter is rotated in the direction indicated by the arrow *b* during the gear-cutting process. The helical surface 29, being on the rear side of the cutting edge 28, will provide clearance as the cutter crosses the face of the worm-gear blank and the space between each helical surface 29 and the forward or advance side of the next succeeding projection B will permit the tooth of the worm-gear blank which is being cut, to pass therebetween. The edge surface 31 is constructed as described in order to prevent excessive cutting of the worm-gear blank at the bottom of the spaces between the teeth, it being understood that these portions of the blank being cut are formed by the cutting edges 33 which are formed at the intersection between the surfaces 31 and 30. On account of the helical formation of the surface 29, the cutting edge 28 formed by the intersection of the faces 30 and 29, will always extend in a plane disposed radially from the axis of rotation of the cutter and at the proper angle thereto as the face 30 is ground down from time to time to sharpen the tool. As will be understood, the number of projections or extensions on the cutter may be varied as desired and will depend upon the relation between the number of teeth on the worm-gear being cut and the number and pitch of the threads of the Hindley screw or worm with which the worm-gear is to be used.

Although I have herein shown and described what I now consider the preferred embodiment of my improvement, yet it will be understood that various changes and modifications may be made without departing from the spirit of the invention, and all such changes and modifications are contemplated as come within the scope of the claims appended hereto.

I claim:

1. A gear cutter of the character described adapted to be rotated including, a central portion having a projection, said projection having a cutting edge disposed in a radial plane and inclined to the axis of rotation of the cutter, and a curved surface extending rearwardly from said edge, substantially as specified.

2. A gear cutter of the character described adapted for rotation which includes a central portion having a projection thereon, said projection having one face thereof coinciding with a portion of a helical surface, the axis of generation of which co-incides with the axis of rotation of the cutter, and another plane face intersecting said first named face at an acute angle, the line of intersection being an active cutting edge, substantially as specified.

3. A gear cutter of the character described adapted for rotation, which includes a central portion having a projection thereon, said projection having one face thereof coinciding with a portion of a helical surface, the axis of generation of which coincides with the axis of rotation of the cutter, another plane face intersecting said first named face at an acute angle, and a curved peripheral edge surface, substantially as specified.

4. A gear cutter for generating worm gears adapted for use with Hindley screws which comprises a hub having a projection, said projection having a cutting edge thereon formed at the intersection of two faces, one of said faces coinciding with a portion of a helical surface, the axis of generation of which coincides with the axis of rotation of the cutter, substantially as specified.

5. A gear cutter of the character described adapted to be rotated and having a cutting edge inclined to its axis of rotation and disposed in a radial plane from said axis of rotation and a peripheral helical surface 33, substantially as specified.

6. A gear cutter of the character described having a hub from which extend a plurality of projections, each of said projections having a cutting edge thereon formed by the intersection of two faces, one of which faces coincides with a portion of a helical surface, the axis of generation of which coincides with the axis of rotation of the cutter, each of said helical faces extending rearwardly from the cutting edge and adapted to provide clearance for the teeth of the worm-gear as the latter pass between two successive projections during the cutting operation, substantially as specified.

7. A gear cutter of the character described adapted for rotation and having a central hub portion from which extends a projection having three helical surfaces 29, 31 and 32 and a plane surface 30, the axes of generation of said helical surfaces coinciding with the axis of rotation of the cutter, substantially as specified.

8. A worm-gear cutter of the character described having a hub 27 and projection B, said projection B having a cutting edge 28 formed at the intersection of a plane surface 30 and helical surface 29, substantially as specified.

9. A gear cutter comprised of teeth having a flat face and a plurality of curved faces merging at a cutting point offset from the body of said cutter.

Signed this 11th day of November, 1913, in the presence of two witnesses.

ANDREW BENSON.

Witnesses:
 WILL H. CLARK,
 JOSEPH HARRIS.